June 10, 1924.

A. SWENSON 1,497,351

FLY NET

Filed Oct. 15, 1923

Inventor
Albert Swenson.

By Geo Swan

Attorney

Patented June 10, 1924.

1,497,351

UNITED STATES PATENT OFFICE.

ALBERT SWENSON, OF PAYNE, MINNESOTA, ASSIGNOR OF ONE-THIRD TO EDWARD SWENSON, OF DULUTH, MINNESOTA.

FLY NET.

Application filed October 15, 1923. Serial No. 668,475.

*To all whom it may concern:*

Be it known that I, ALBERT SWENSON, a citizen of the United States, residing at Payne, in the county of St. Louis and State of Minnesota, have invented certain new and useful Improvements in Fly Nets, of which the following is a specification, reference being had therein to the accompanying drawing.

This invention relates to fly or mosquito netting such as commonly used upon animals to protect them against the ravages of insect pests.

The principal object of my present invention is to provide means whereby the netting when applied to an object for protection is held spaced therefrom so as to render it impossible for the ordinary insect, either fly or mosquito, to reach the object being protected.

Another advantageous feature of the invention is that of providing an air space between the netting and the object being protected, when the latter is an animal.

Still other objects and advantages will appear in the further description of the invention.

Referring now to the accompanying drawing forming part of this application and in which like reference characters indicate like parts:

1 represents the ordinary fly netting as used upon horses or the like upon the under side of which I propose to fasten in any desired manner supporting knobs, discs, or balls 2, as practice may determine expedient for the purpose, these supporting elements being sufficiently close together upon the under side of the netting to support the latter spaced from the body of the animal, so that a fly or other insect standing thereupon cannot reach the skin of the animal.

In the manufacture of such nets or netting it may be found desirable to form within the fabric a series of spaced cords or threads, as indicated at 3, which are considerably larger than the woof or warp of the netting and to which the balls or discs as the case may be are attached in any desired manner.

Figure 1:
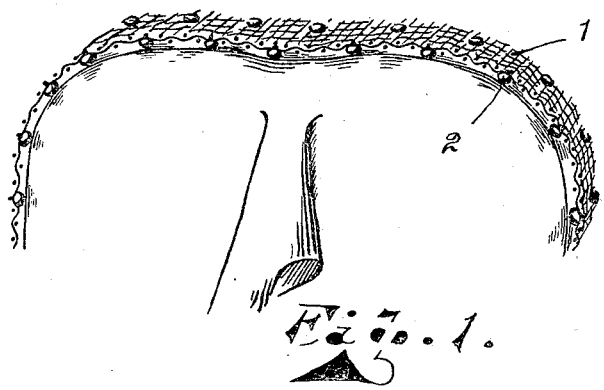
Figure 1 is a sectional view of a piece of netting as applied to the back of an animal.
Figure 2:
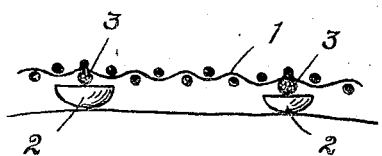
Figure 2 is an enlarged fragmental sectional view of the improved netting.
Figure 3:
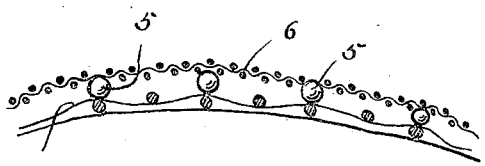
Figure 3 is a similar view of a modified form of netting.

In Figure 3 I have illustrated an embodiment of the invention which involves the use of an auxiliary fabric indicated at 4 which carry the balls 5 and upon which latter the ordinary fly netting 6 may be used. In the use of such a device the fabric 4 carrying the balls or supporting members whatever they may be is first applied to the object to be protected, when the netting is thrown thereover in the usual manner.

It is evident that other means of supporting the netting at spaced intervals may be employed, and I do not wish to be confined to any specific form of construction; it being apparent that the gist of the invention resides in maintaining the net spaced from the object being protected.

From the foregoing it is evident that I have devised an exceedingly simple means of furthering the advantages of a fly netting and render same vastly more humanitarian, as it is well known that unless in motion flies or mosquitoes may torment an animal in spite of the ordinary netting resting flatly thereupon.

Having thus described my invention, what I claim and desire to secure by Letters Patent, is:

1. A removable insect protector for animals comprising in combination a coarse fabric carrying at equally spaced intervals abnormally protruding elements and a fly netting supported upon said elements for the purpose described.

2. A removable insect protector for animals comprising in combination a common fly netting, and equally spaced ball like means disposed between the netting and the body of the animal to which the protector is applied.

In testimony whereof I hereunto affix my signature in the presence of two witnesses.

ALBERT SWENSON.

Witnesses:
S. C. BRONSON,
S. GEO. STEVENS.